United States Patent
Kreamer

(10) Patent No.: US 10,842,170 B2
(45) Date of Patent: Nov. 24, 2020

(54) PROCESS FOR MAKING A PET TREAT

(71) Applicant: Spectrum Brands, Inc., Middleton, WI (US)

(72) Inventor: Marc Kreamer, Delray Beach, FL (US)

(73) Assignee: Spectrum Brands, Inc., Middleton, WI (US)

( * ) Notice: Subject to any disclaimer, the term of this patent is extended or adjusted under 35 U.S.C. 154(b) by 310 days.

(21) Appl. No.: 14/981,162

(22) Filed: Dec. 28, 2015

(65) Prior Publication Data

US 2017/0181447 A1    Jun. 29, 2017

(51) Int. Cl.
| A23K 10/26 | (2016.01) |
| A23K 50/40 | (2016.01) |
| A23K 20/10 | (2016.01) |
| A23K 20/179 | (2016.01) |
| A23K 40/30 | (2016.01) |
| A23K 10/20 | (2016.01) |
| A23K 50/42 | (2016.01) |
| A23K 30/00 | (2016.01) |

(52) U.S. Cl.
CPC .............. *A23K 10/26* (2016.05); *A23K 10/20* (2016.05); *A23K 20/10* (2016.05); *A23K 20/179* (2016.05); *A23K 30/00* (2016.05); *A23K 40/30* (2016.05); *A23K 50/40* (2016.05); *A23K 50/42* (2016.05)

(58) Field of Classification Search
CPC ...................................................... A23K 10/26
See application file for complete search history.

(56) References Cited

U.S. PATENT DOCUMENTS

| 1,149,170 | A | | 8/1915 | Allis |
| 1,498,800 | A | | 6/1924 | Lewis |
| 2,185,547 | A | | 1/1940 | Fowler |
| 2,469,589 | A | | 5/1949 | Barricini |
| 2,988,045 | A | | 6/1961 | Fisher |
| 4,902,519 | A | | 2/1990 | Ream et al. |
| 5,635,237 | A | * | 6/1997 | Greenberg ............ A23K 40/20 426/284 |
| D391,735 | S | | 3/1998 | Baker |
| D392,435 | S | | 3/1998 | Mocking et al. |
| 5,773,070 | A | | 6/1998 | Kazemzadeh |
| D408,948 | S | | 4/1999 | Huettner et al. |
| 5,897,893 | A | * | 4/1999 | Mohilef ............... A01K 15/026 119/709 |
| D415,803 | S | | 10/1999 | Cousins |
| 6,042,873 | A | | 3/2000 | Lawson |
| 6,054,159 | A | | 4/2000 | Manzone |
| 6,060,100 | A | | 5/2000 | Koller |
| D427,391 | S | | 6/2000 | Gill |
| 6,113,956 | A | | 9/2000 | Bower |
| 6,159,508 | A | | 12/2000 | Wolf et al. |
| D435,713 | S | | 1/2001 | Speck |
| D435,955 | S | | 1/2001 | Speck |

(Continued)

*Primary Examiner* — Jenna A Watts

(74) *Attorney, Agent, or Firm* — Merchant & Gould P.C.

(57) ABSTRACT

A composition and process for making pet food treats is described herein. Auxiliary ingredients are combined to form a meat mixture. The meat mixture is formed into portions. The portions of meat mixture are positioned on a chew stick that comprises rawhide. The pet treat gives the appearance of a grilled shish kabob, where the meat portions are meant for initial taste, while the chew stick will provide the dog with a longer-lasting chewing portion.

10 Claims, 9 Drawing Sheets

(56) References Cited

U.S. PATENT DOCUMENTS

| | | |
|---|---|---|
| 6,228,402 B1 | 5/2001 | Wolf et al. |
| 6,277,420 B1 | 8/2001 | Andersen et al. |
| D485,046 S | 1/2004 | Hague |
| D489,161 S | 5/2004 | Hague |
| D497,457 S | 10/2004 | Willinger |
| 6,827,041 B2 | 12/2004 | Hague et al. |
| D503,507 S | 4/2005 | Jia et al. |
| D505,533 S | 5/2005 | Jia et al. |
| D508,762 S | 8/2005 | Jia et al. |
| D525,397 S | 7/2006 | Wang |
| D527,164 S | 8/2006 | Speck et al. |
| D530,484 S | 10/2006 | Ahmed et al. |
| D534,331 S | 1/2007 | Axelrod |
| D544,176 S | 6/2007 | Rubin |
| D551,426 S | 9/2007 | Ahmed et al. |
| D569,077 S | 5/2008 | Axelrod |
| 7,485,330 B2 | 2/2009 | Anderson et al. |
| D594,182 S | 6/2009 | Hague |
| D626,706 S | 11/2010 | Ragonetti |
| D639,967 S | 6/2011 | Bredemeier et al. |
| D644,333 S | 8/2011 | Bredemeier et al. |
| D645,640 S | 9/2011 | Mingyun et al. |
| D648,594 S | 11/2011 | Bray |
| D651,771 S | 1/2012 | Shanghui |
| D661,458 S | 6/2012 | Mingyun et al. |
| 8,257,775 B2 | 9/2012 | Axelrod et al. |
| D672,099 S | 12/2012 | Simms et al. |
| D683,516 S | 6/2013 | Elias |
| D684,746 S | 6/2013 | Pang et al. |
| 8,491,950 B2 | 7/2013 | Grammer et al. |
| 8,496,985 B2 | 7/2013 | Langford |
| D692,627 S | 10/2013 | Yerton et al. |
| D696,836 S | 1/2014 | Chen |
| D706,943 S | 6/2014 | Bredemeier et al. |
| 8,747,934 B2 | 6/2014 | Meskendahl et al. |
| D708,417 S | 7/2014 | Allen |
| D708,418 S | 7/2014 | Allen |
| D708,818 S | 7/2014 | Axelrod et al. |
| D726,991 S | 4/2015 | Albuja |
| D752,841 S | 4/2016 | Neely et al. |
| D759,341 S | 6/2016 | Templeman et al. |
| D762,042 S | 7/2016 | Osenga |
| 2004/0005392 A1 | 1/2004 | Filipi et al. |
| 2004/0028783 A1 | 2/2004 | Fullwood et al. |
| 2004/0126462 A1* | 7/2004 | Tepper ............... A01K 15/026 426/89 |
| 2004/0219260 A1 | 11/2004 | Anderson et al. |
| 2005/0033157 A1 | 2/2005 | Klein et al. |
| 2005/0069609 A1 | 3/2005 | Straus et al. |
| 2007/0218171 A1 | 9/2007 | Mehrle et al. |
| 2007/0264415 A1 | 11/2007 | Axelrod et al. |
| 2008/0014311 A1 | 1/2008 | Tepper et al. |
| 2008/0145485 A1 | 6/2008 | Tepper et al. |
| 2008/0175962 A1 | 7/2008 | Grammer et al. |
| 2008/0193607 A1 | 8/2008 | Tepper et al. |
| 2009/0004338 A1* | 1/2009 | Anderson ........... A01K 15/026 426/92 |
| 2010/0062111 A1 | 3/2010 | Langford |
| 2010/0303970 A1 | 12/2010 | Grammer et al. |
| 2010/0304002 A1 | 12/2010 | Grammer et al. |
| 2012/0237648 A1* | 9/2012 | Ortiz ................ A22C 17/0026 426/250 |
| 2013/0029011 A1 | 1/2013 | Carrillo et al. |
| 2013/0295235 A1 | 11/2013 | Albuja et al. |
| 2013/0309359 A1 | 11/2013 | Langford |
| 2014/0186276 A1 | 7/2014 | Mahe |
| 2014/0335223 A1 | 11/2014 | Grammer et al. |
| 2015/0090192 A1 | 4/2015 | Powers et al. |
| 2016/0029667 A1 | 2/2016 | Smittle et al. |
| 2016/0143320 A1 | 5/2016 | Mahe et al. |

* cited by examiner

PROCESS FOR MAKING A PET TREAT

One of the main attributes of chew type products is a toughness and flexibility to the point where it takes the dog a long time to consume the product. A great majority of the chew style products include rawhide. While rawhide is used as a base material, it has limited acceptability because it does not maintain a dog's interest. Manufacturers have attempted to solve this problem of reduced acceptability by incorporating numerous ingredients and processing techniques into the manufacture of rawhide-based chews for dogs, such as incorporating meat in the middle of a rawhide stick.

Despite this, the basic problem remains. As ingredients or processing techniques are utilized with rawhide to increase palatability, they typically weaken the basic structure of the rawhide and produce a less acceptable product from the standpoint of extended chew time. Further, the rawhide stick does not provide a visually appealing treat for dog. The pet treat also does not give the pet owner a visually acceptable reaction when purchasing the pet treat. What is needed is a pet treat that provides a visually appealing product that stimulates a human to purchase the pet treat. What is needed is a pet treat that provides a palatable product for a pet and can provide an initial taste reward, but also gives the dog a chew portion for sustained pet treat duration.

The prior art demonstrates utilizing rawhide in dog chews, Fisher (U.S. Pat. No. 2,988,045) demonstrated the basic techniques of how rawhide can be separated at the tannery and split into layers that can be formed into shapes followed by dehydration to produce a shelf-stable rawhide chew for dogs. A wide range of patents for rawhide chew style products followed, teaching various forms, shapes and methods for utilizing a basic rawhide fraction as a dog chew. This included Lehn (U.S. Pat. No. 4,702,929) which teaches a method for extruding rawhide byproduct fraction, called spetches, with starch to form a dog chew in stick form. Spanier (U.S. Pat. No. 5,047,231) teaches a method of soaking an inorganic pyrophosphate salt into rawhide to form a chew capable of reducing tartar accumulation on the dog's teeth. Perlberg (U.S. Pat. No. 6,223,693) demonstrates a method of soaking rawhide in a humectant and soft edible binder to produce a flexible edible chew. Twain (U.S. Pat. No. 6,425,348) taught a method for producing a chewable pet shelter from rawhide which incorporated chemical flavoring which would appeal to the pet.

Kirch (U.S. Pat. No. 6,840,196) demonstrates a pet chew produced by folding a first sheet of rawhide around a second sheet of rawhide. The second sheet is impregnated with a flavoring and protrudes from under the first sheet of rawhide. This system served to increase the palatability of the chew while at the same time reduced the incident of rug staining which can be a problem when the flavoring is present on the surface of the product.

Hingst (U.S. Pat. No. 6,895,900) disclosed a combination rawhide and pigskin product where sheets of rawhide and pigskin are sandwiched or intertwined together to form a treat with improved flavor. Jia (U.S. Pat. No. 6,935,275) teaches a method for producing a dog treat by rolling a precut and flavored rawhide piece into a cylinder with strips of hide extending from the outer ends of the cylinder.

Hague (U.S. Pat. No. 6,886,497) disclosed a product and method for infusing a rawhide or pigskin with a mint, or chlorophyll, flavoring and applying perforations to the hide so that a dog's teeth would penetrate into the product to assist in the cleaning of the dog's teeth.

Some of the most commercially successful products utilizing rawhide as dog treats have taken the approach of incorporating a meat fraction in conjunction with the rawhide to significantly increase the palatability of the chew. Sherrill (U.S. Pat. No. 5,673,653) disclosed a product and process of wrapping jerky sheets on the inside of a roll of rawhide. The jerky fraction protruded from the ends and the horizontal seam of the outside layer so that the dog could quickly be subjected to the flavor of the dehydrated meat fraction. This product is commercially known as a "Dingo" treat. Only a small portion of meat fraction however is initially available to the dog and the manufacturing method of rolling rawhide within sheets of jerky significantly reduce the quantity of meat that can be incorporated on a dry weight basis.

Greenburg (U.S. Pat. No. 5,635,237) teaches a method of melting rawhide scraps inside of a twin-screw extruder and producing ropes that can be cut and tied to produce a formulated knotted rawhide bone. While small quantities of meat or flavoring can be incorporated with this method, the necessity to feed the extruder at a reduced moisture level limits the amount of meat fraction that can be included.

Andersen (U.S. Pat. No. 6,277,420) demonstrates a method of making a preformed rawhide tube and depositing a shelf-stable liquid meaty filling into the cavity of the tube which gels and then forms a solid matrix on the inside of the rawhide. While this system incorporates large ratios of meaty filling fraction to rawhide, the chew time is somewhat reduced by the high moisture present in the system.

Brown (U.S. Pat. No. 6,886,496) has attempted to solve this problem by producing a pre-extruded dried meaty log that could be placed inside of a rolled rawhide cylinder. While this would result in a somewhat extended chew time over many of the earlier treats, a limited fraction of meat is available on the surface of the final chew to maintain a dog's interest for an extended period of time. Further, the initial meat reward may not be sufficient to entice the dog to finish the treat leaving a remnant of the treat behind.

Yet there is nothing in the prior art that provides a dry outer meat portion for initial flavor enhancement, with a rawhide chew for a subsequent dog chew that is appealing to a pet. The pet treat being sized to provide an intermediary pet treat that is more substantial than a "reward treat," (i.e. dog biscuit) but will take less time to consume when compared to a classic rawhide bone.

SUMMARY

A composition and process for making pet food treats is described herein. Animal meant and auxiliary ingredients are combined to form a meat mixture. The meat mixture is formed into portions. The portions of meat mixture are positioned on a chew stick that comprises rawhide. The pet treat gives the appearance of a grilled shish kabob, where the meat portions are meant for initial taste and the chew stick will provide the dog with a longer-lasting chewing portion.

DETAILED DESCRIPTION

Figure 1:
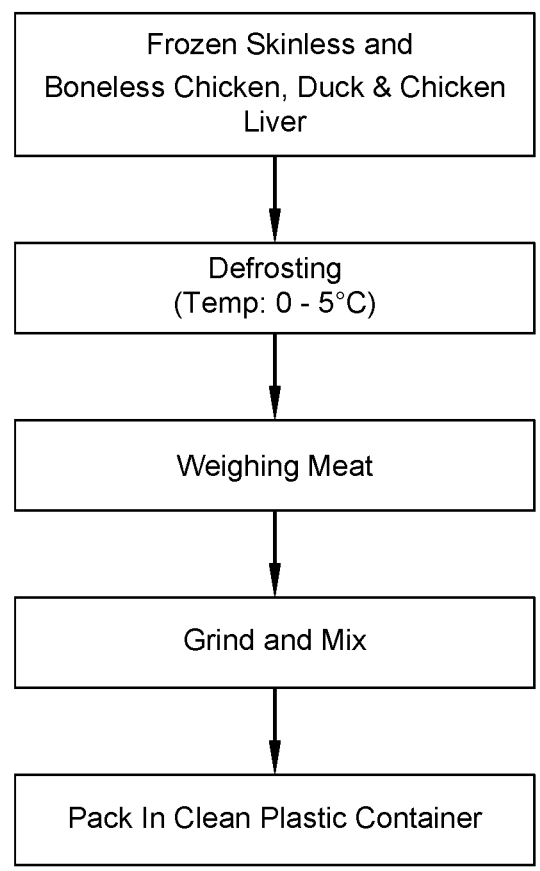
FIG. 1 illustrates one embodiment of a process of making a meat mixture.

The method of making a pet treat is described herein. FIGS. 1-6 illustrate schematic depictions of particular aspects of the methods of making a pet treat. The method comprises forming a meat mixture into portions and positioning a one or more portions on a chew stick, and drying the pet treat. As shown in FIG. 1, the meat base is made from animal meat and may comprise boneless chicken, duck, chicken liver and combinations thereof. The animal meat may be fresh, dehydrated, powdered, and extract or frozen. The frozen animal meat is defrosted at about 0 degrees Celsius to about 5 degrees Celsius. Once the animal meat is defrosted, the animal meat is weighed. Once the predetermined amount of animal meat is weighed, the meat is placed in a grinder, the animal meat(s) is ground and mixed with the specific desired ratio of animal meat(s) and stored in a container as a meat base. It should be noted that the meat base may be frozen for later use, or may be used immediately after the meat base is prepared. Further, one should appreciated that although boneless chicken, duck and chicken liver are noted in FIG. 1, the meat base can also include beef, pork, lamb, goat, horse, buffalo, venison, elk, moose, chicken, turkey, fish, or any other seafood, or any combination of two or more thereof. Alternatively, the meat base need not include boneless chicken, duck and/or chicken liver and may comprise beef, pork, lamb, goat, horse, buffalo, venison, elk, moose, bone-in chicken, turkey, fish, or any other seafood, or any combination of two or more thereof. The term "meat" associated with "meat base" and "meat mixture" are intended to encompass portions of animals, mammal and non-mammal, that can be used for a pet treat. This includes but is not limited to soft tissue, internal organs, cartilage and bone.

In one embodiment of the invention, chicken meat is used as a meat base. Chicken meat can include, for example, necks, breasts, or backs, or any combination of two or more thereof, with or without cartilage and/or bone ground to small sizes (i.e., emulsified). Chicken meat can also include necks, breasts, or backs, or any combination of two or more thereof that are boneless and ground to desired sizes. Chicken meat can include mechanically separated chicken (MSC). Chicken meat can also include a mixture of boneless or bone-in chicken, mixed together in various portions. The chicken meat is used in an amount of about 6-35% by weight of the meat mixture. It should be appreciated that the other animal sources, including various sections of the animal can be used to provide a final taste or consistency for the meat. In embodiments where other meat sources are used, the total meat content is 6% to 35% by weight of the meat mixture.

Figure 2:
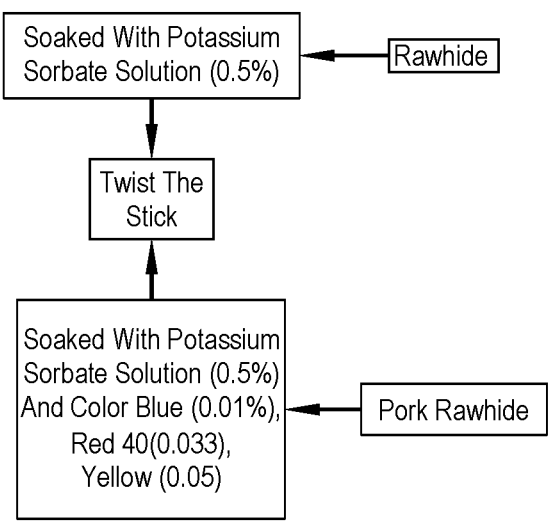
FIG. 2 illustrates one embodiment of a process of making a chew stick.

The process of forming a chew stick includes, but is not limited to the use of rawhide, or other similar materials to form an elongated section. It should be appreciated that the chew stick, as described herein may be made from several processes available to one skilled in the art; for example, extrusion, molding and the like are within the scope of the invention. In one example embodiment, the chew stick is prepared by shaping a piece of rawhide to form an elongated chew. As shown in FIG. 2, chew stick (illustrated in FIG. 7) is manufactured by taking a rawhide sheet and twisting the sheet to form an elongated stick-shape chew. As described in FIG. 2, a first rawhide sheet is cut to an appropriate size and a second sheet of rawhide is also cut in the shape of a similarly sized proportion. As shown, the first sheet and second sheet may be rawhide from different animals. In at least this example embodiment, the second sheet is a pork rawhide. Each rawhide sheet is soaked in a potassium sorbate solution. As shown, the potassium sorbate solution is (0.5%). Moreover, the second sheet has color agents added to enhance the overall appearance of the sheet. In this manner, the second sheet will provide a darker meat-like color to provide an additional visual enhancement for the overall pet treat. Still referring to FIG. 2, second rawhide sheet is colored with Color Blue, Red 40 and Yellow. It is important to note that the concentrations listed are representative of concentrations that can be utilized. However one of ordinary skill in the art would readily appreciate that the physical characteristics and animal origin of the rawhide may require modifications in the combinations and concentrations of each coloring agents to achieve a desired chew stick appearance. The sheets of rawhide may also be flavored according to one of the processes described herein.

The second sheet is placed upon the first sheet in the same general orientation, the two rawhide sheets are twisted together, as described, to make a multi-component chew stick. Once the rawhide sheets are twisted together, they are dried. In one example embodiment the chew stick is dried in an oven at 40 degrees Celsius to 65 degrees Celsius for 4 to 5 hours. Upon removing the dried chew stick from the oven, the sticks are allowed to cool to allow for ease in handling.

In some example embodiments, at least one rawhide section is soaked in a potassium sorbate solution prior to forming said chew stick. One skilled in the art can readily ascertain the precise concentration needed to provide sufficient anti-mold activity. For example, one concentration includes a concentration of potassium sorbate at 0.5% v/v. The chew stick can be formed in a variety of ways. In order to achieve a dual component appearance, one rawhide piece may be twisted where a portion of chew stick is colored to provide the appearance of a multi-layered chew stick. Referring again to FIG. 2, two rawhide pieces can be used. In some related embodiments, the at least two rawhide pieces are from different animal sources.

Figure 3:
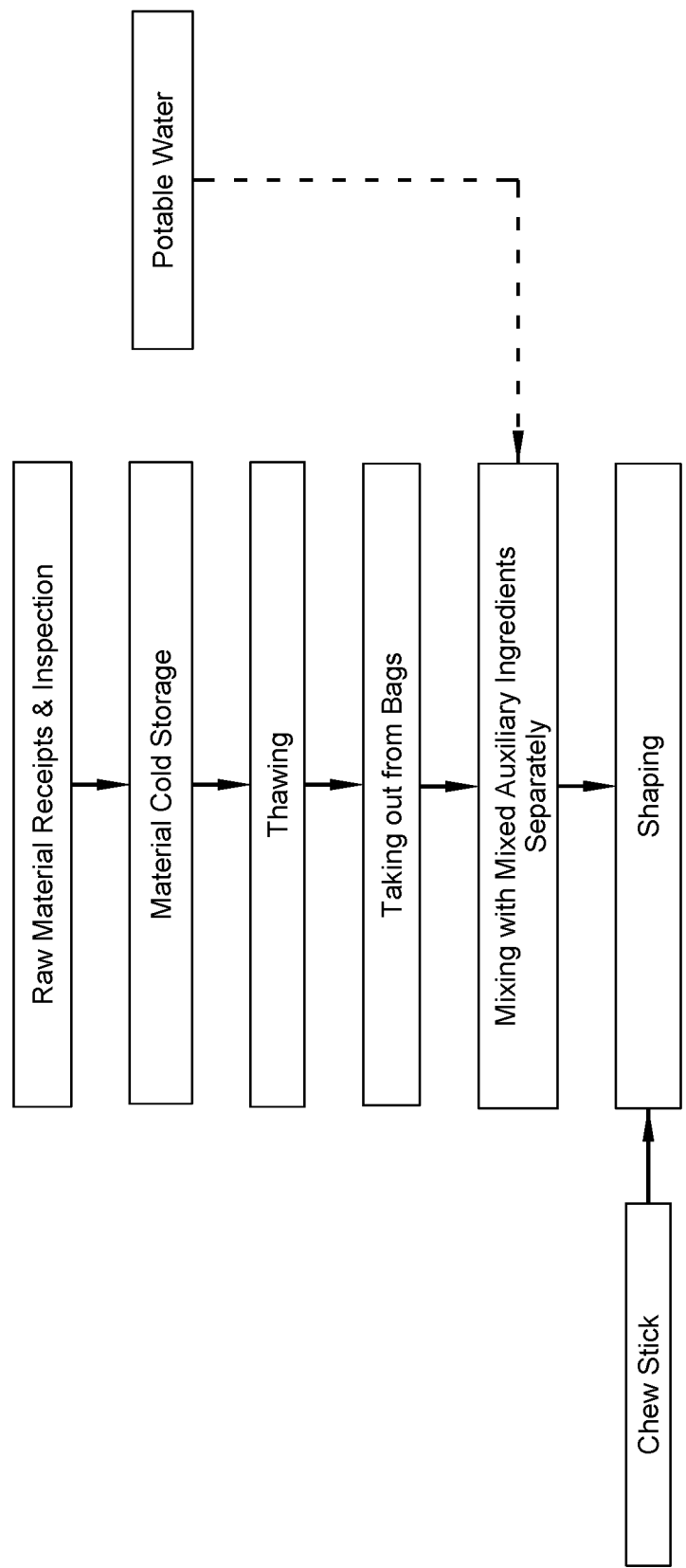
FIG. 3 illustrates one embodiment of a process of making a pet chew.

FIG. 3 describes one example method of receiving, storing and processing meat base to form a meat mixture. To that end, meat base can be stored at sub-zero temperatures, although fresh meat base is also within the scope of the invention. The frozen meat base is ready for further processing by thawing the meat base. In some example embodiments, meat base is thawed using a microwave. Alternatively, the meat base can be thawed by other devices known by one of ordinary skill in the art. One such alternative device is a tempering device.

The frozen containers (i.e. bags) of meat base are thawed and the meat base is placed in a tumbler to begin the process of forming a meat mixture. Once the meat base begins the tumbling process, the meat base is combined with auxiliary ingredients forming a meat mixture. The meat base can be used in an amount between about 30% and about 90% by weight of the meat mixture, for example about 60% by weight of the meat mixture. In some example embodiments, the meat base and auxiliary ingredients can optionally be subjected to a vacuum to form a homogeneous meat mixture. The vacuum can remove entrapped air and can provide a more dense and homogenous blend. The vacuum can be applied at a level from about 0 to about 30 mm/Hg.

The meat mixture is prepared by mixing the meat base with auxiliary ingredients that may include a binding agent, a salt, a sugar, an acid, a mold inhibitor, a flavoring compound, an aroma compound, a coloring compound, a moisturizing compound or any combination of two or more thereof.

The binding agent can be used in an amount between about 10% and about 75% by weight of the meat mixture. In one example embodiment the binding agent is about 20% by weight of the meat mixture. The type and amount of binding agent can be selected so that the resulting product is not sticky and no residue is left on the pet owners' finger-tips or household's surfaces, such as carpets. For example, the binding agent can be added to "buffer" or to absorb fat content in the meat mixture. The binding agent can also facilitate the blending of the various ingredients and allow the meat mixture to hold a shape prior to being dried.

The binding agent can include, but is not limited to, oat flour, soy flour, wheat flour, rice flour, potato flour, corn flour, rye flour, buckwheat flour, chestnut flour, chickpea flour, atta flour, pea flour, bean flour, amaranth flour, arrowroot flour, taro flour, cattail flour, acorn flour, sorghum flour, or tapioca flour, or a combination of two or more thereof. The flour, in this case wheat flour, is incorporated in amount of no more than 25% by weight of the meat mixture.

The aroma compound or flavoring compound, provide palatability enhancement respectively and include, but are not limited to, garlic (e.g., garlic concentrate, garlic oil, garlic powder, garlic aroma), onion (e.g., onion concentrate, onion oil, onion powder, onion aroma), natural smoke flavor, hickory, mesquite, anchovy, chicken, lobster, tikka, tandoori, parsley, spinach, saffron, digestive (liquid stomach contents of an animal, e.g., chicken), phosphate, yeast, or enzymatic liver (pork, turkey or chicken), or any derivative thereof, or any combination of two or more thereof. Additionally salt may be added to enhance flavor and can also provide particle binding in forming meat mixture.

The aroma compound or flavoring compound can be used in an amount between about 0% and about 5% by weight of the meat mixture, for example less than about 1% by weight of the meat mixture. The coloring compound can be used in an amount between about 0% and about 4% by weight of the meat mixture, for example less than about 1% by weight of the meat mixture. Flavoring compounds can be used in an amount between about 0% and about 0.5% by weight of the meat mixture, for example about 0.25% by weight of the meat mixture.

Coloring compounds provide cosmetic enhancement respectively and include, but are not limited to, caramel coloring, malliouse, allura red AC, annatto, astaxanthin, betanin or beetroot red, blue 2, brilliant black BN, brilliant blue FCF, brown FK, canthaxanthin, carmine, carotene, Color Blue, curcumin, erythrosine, orange number 1, iron oxide, orange B, ponceau 6R, red 40, red 2G, saffron, sunset yellow FCF, tartrazine, titanium dioxide, turmeric, yellow 5, yellow 2, or any combination of two or more thereof.

The humectant can be used to reduce water activity. Water activity is a measure of the availability of water in a food for microbial growth such as molds. Water activity is a primary method of controlling antimicrobial or mold growth. One example range of water activity is an aW value of less than 0.7. The humectant including sugar, or sugar alcohols can be used in an amount between about 0% and about 20% by weight of the meat mixture, for example about 15% to 18% by weight of the meat mixture. The humectant, can include, but is not limited to fructose, dextrose, maltodextrin, honey, high-fructose corn syrup, maltose, brown sugar, coconut sugar, date sugar, sucanat, molasses, turbinado sugar, dextrin, glucose, sucrose, sucralose, glycerin or any derivative thereof, or any combination of two or more thereof.

The meat mixture may also include a mold inhibitor. A non-exclusive list of mold inhibitors include, but is not limited to, potassium sorbate, cultured whey, calcium propionate, cultured dextrose, cultured yeast, benzoic acid, acetic acid, or plum powder, or any derivative thereof or any combination of two or more thereof.

A moisturizing compound can be used in a range of between 2% and 20%. For example, a moisturizing compound, such as water, will aid in formation of the meat mixture. For example, the moisture content of the meat mixture may be above 20% prior to drying the pet treat, but will achieve a moisture content below 20%, for example 18%, in the final pet treat product.

It should be appreciated that each of these ingredients other than the meat base is optional, such as the ingredients with a percentage range starting at 0%. Table 1 and 2 describe example formulations for pet treat.

TABLE 1

| Name | % |
|---|---|
| Rice Starch | 21.363 |
| Rawhide | 21.178 |
| Chicken Meat | 13.26 |
| Pork Rawhide | 12.683 |
| Duck meat | 12.085 |
| Glycerin | 11.416 |
| Chicken liver | 1.779 |
| Potassium Sorbate | 0.155 |
| FD&C Red 40 | 0.068 |
| FD&C Yellow 6 | 0.011 |

TABLE 2

| Name | % |
|---|---|
| Rawhide | 22.81 |
| Chicken breast meat | 20.07 |
| Pork Rawhide | 17.18 |
| Duck breast | 13.15 |
| Wheat flour | 11.85 |
| Glycerin | 10.21 |
| Chicken liver | 4.58 |
| Garlic powder | 0.14 |
| FD&C Red #40 | 0.0004 |
| FD&C yellow #6 | 0.0048 |
| FD&C Blue #1 | 0.0048 |
| Total Ingredients | 100% |

After mixing the meat base with the auxiliary ingredients and optionally subjecting it to a vacuum in the tumbling device, the temperature of the mixture can be checked. If the temperature is too high the mixture can be cooled, by techniques such as the addition of $CO_2$. Conversely, if the temperature is too low additional heat is applied to facilitate the formation of the meat mixture.

Figure 4:
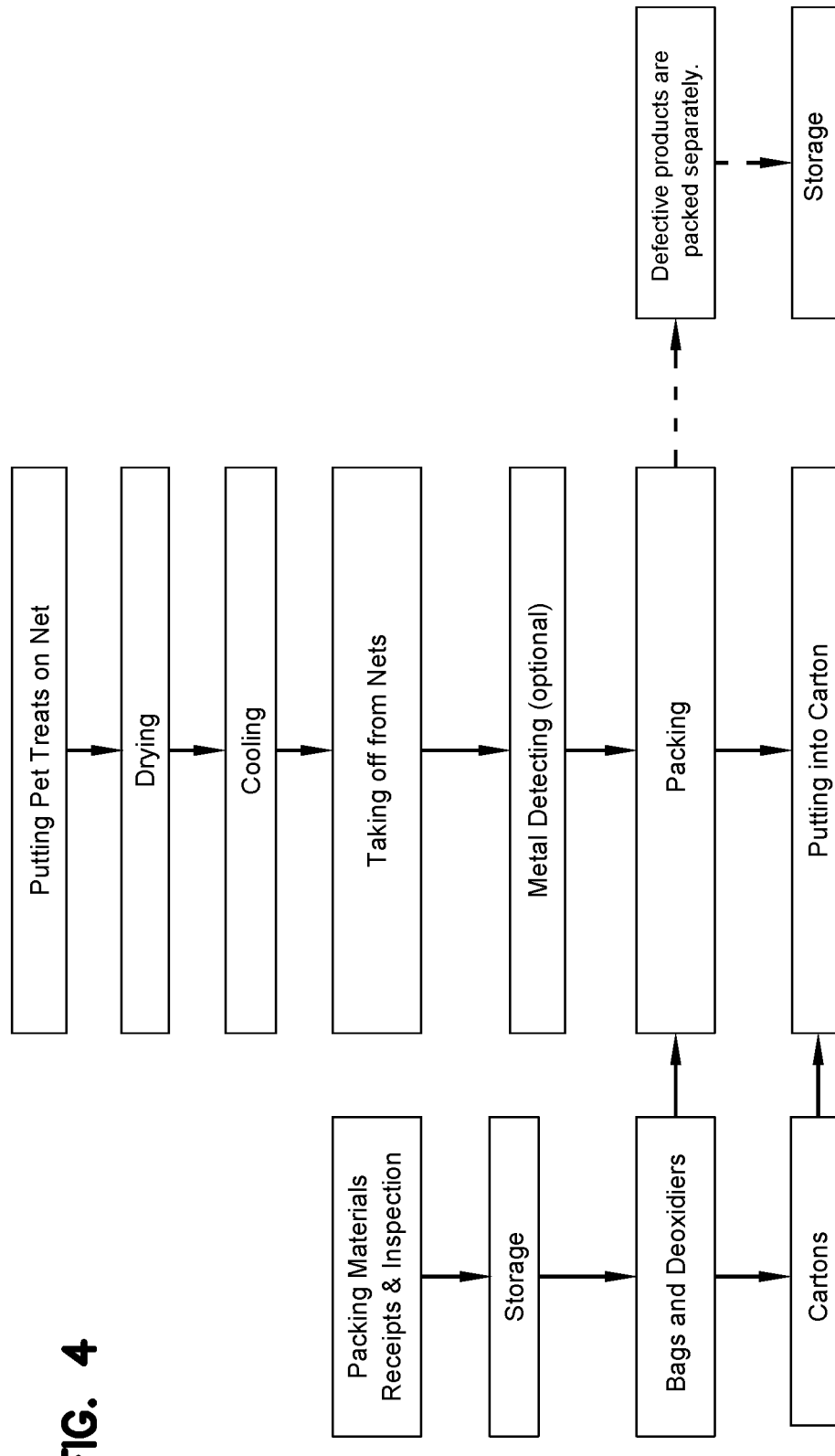
FIG. 4 illustrates one embodiment of a process of drying a pet treat.
Figure 6:
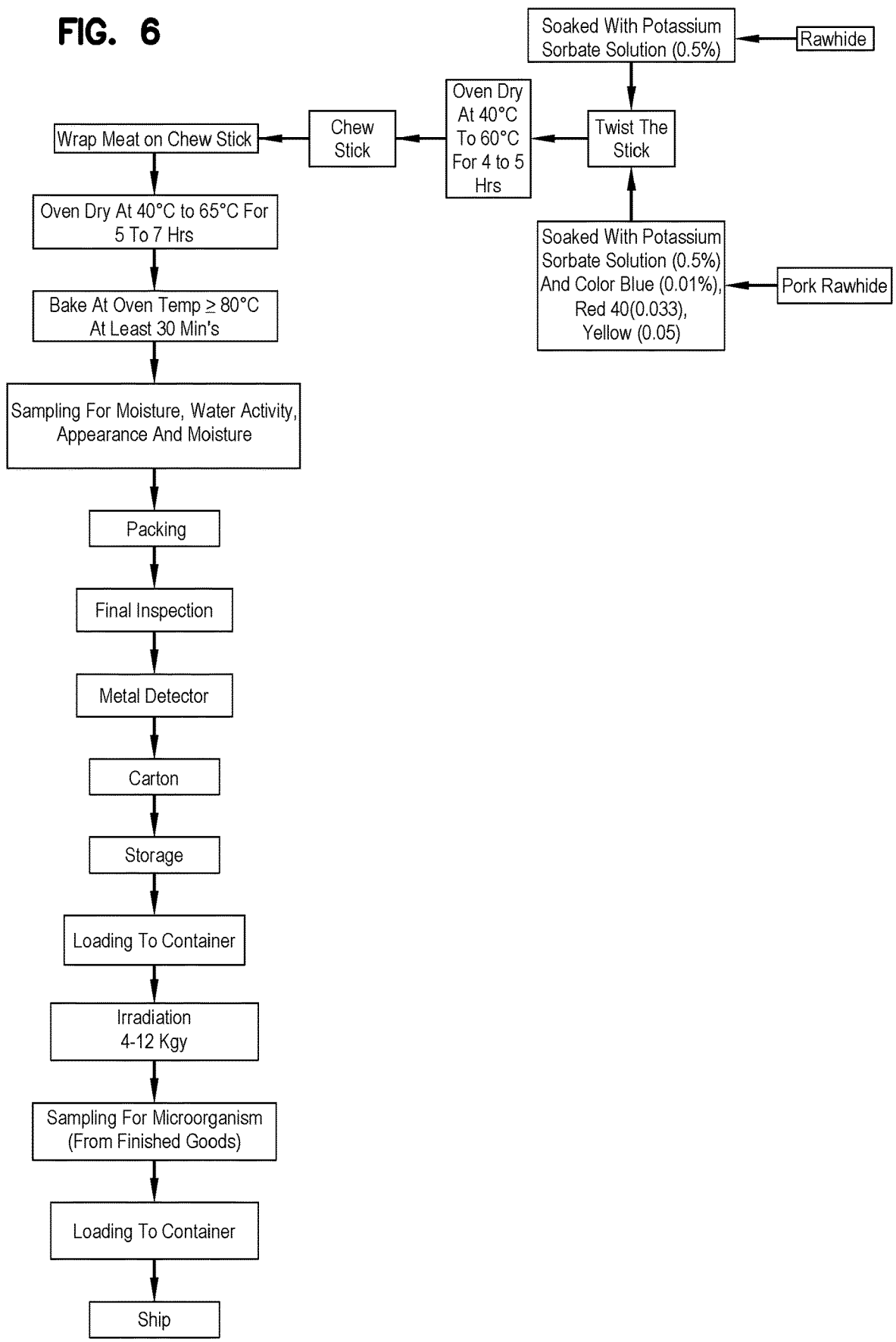
FIG. 6 illustrates one embodiment of a pet treat manufacturing process.
Figure 7:
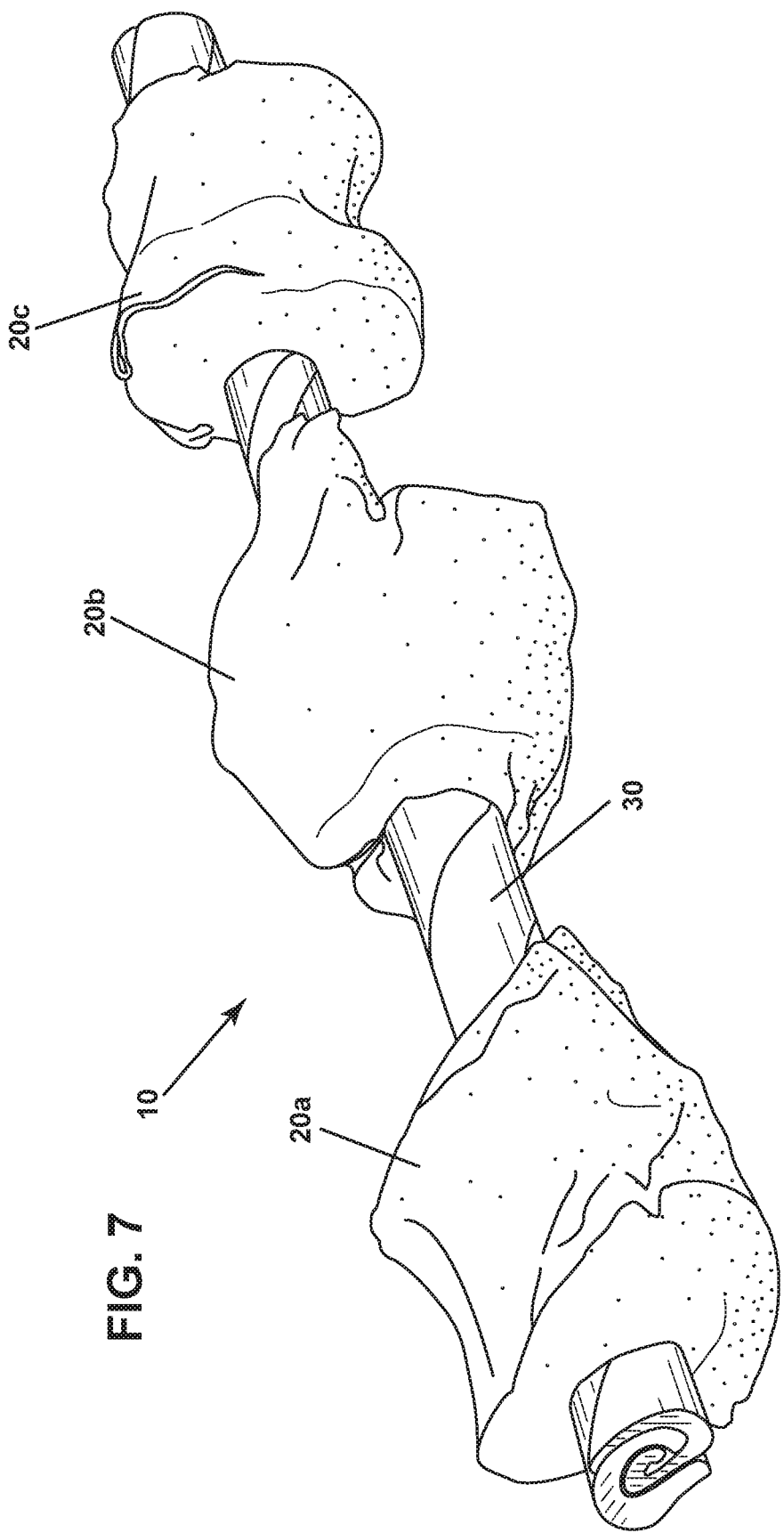
FIG. 7 is a perspective view of a pet treat.

Referring now to FIGS. 4 and 6, where the meat mixture is transported to a production area and portioned. Each portion of meat mixture is positioned on the chew stick 30. FIG. 7 shows a perspective view of one or more portions 20 positioned on a chew stick 30. Although not wanting to be bound by any particular theory, the portions of meat mixture can be wrapped around chew stick in a manner that will require that a portion is pinched to remove any gaps. In an alternative embodiment the chew stick is pressed through the middle of portion, similar to placing meat or vegetables on a skewer when making shish kabobs.

In one embodiment, the portion of meat mixture may vary although portions between 0.25 inches and 1.5 inches are typical. The portions will typically range in weight, but will be between 0.25 and 4 oz. Furthermore, although the portions are generally made cylindrical in shape, the portions can be made with other shapes and conformations. For example, the geometrical shape of the base of the cylinder can be selected as desired, such as made round or flat. In addition, the portions can be shaped so as to form, generally round-shaped meat pieces (generally referred to as meatballs), cubic-shaped meat pieces, cylindrical-shaped meat pieces (for example, meat pieces resembling sausages), polygonal-shaped meat pieces, pyramid-shaped meat pieces, heart-shaped meat pieces, flat-wafer-shaped, or other more complex-shaped meat pieces.

Referring now to FIG. 4, once the desired number of portions is positioned on the chew stick, the pet treat may be moved to a surface that will form grooves on the outer surface of the portion. In this regard, the surface can be made of a number of materials. However, the materials must be compatible with the drying temperatures and duration. In one example embodiment, the surface is a net. A net allows for the weight of each pet treat to "nestle" on the netting and thus form grooves along the outer surface of the one or more portions.

The meat pieces can then be transferred via conveyor or manual transportation to a drying oven. The drying step is in an oven at about 40 degrees Celsius to about 60 degrees Celsius. In some example embodiments the drying time is at least 5 hours. In related embodiments, the drying time is between 5 to 7 hours. Additionally the pet treat may further be baked. The optional baking step is at a temperature of at least 80 degrees Celsius for at least 30 minutes.

Once the baking step is finished the pet treats are removed from the oven and allowed to cool. Cold air or any other cold gas is forced on the surface which transports the pet treats from the oven to packaging. Air or gas that is warmed by contact with the pet treats is re-circulated and passed through refrigerated plates to cool the air/gas and then the air/gas is blown again over the pet treat. This process can be repeated numerous times until the pet treats are cooled to a desired temperature.

Figure 5:
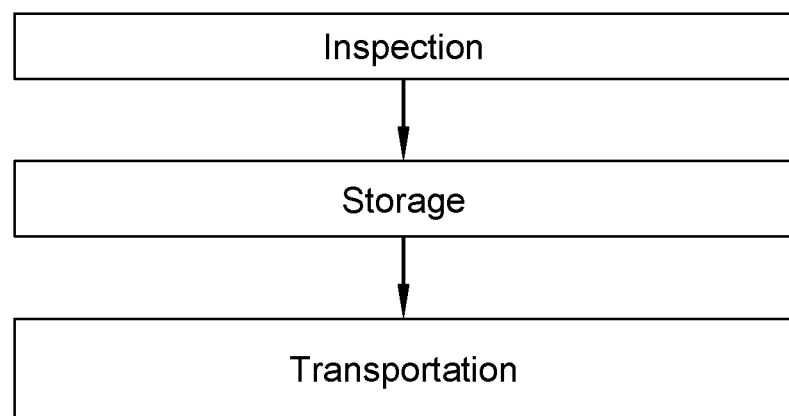
FIG. 5 illustrates one embodiment of a process of inspecting a pet treat prior to shipment.

Referring now to FIGS. 5 and 6, where the cooled pet treats are removed from the surface and will have grooves along the outer surface of the one or more portions. This will give the pet treat the appearance of a grilled shish kabob. In one example embodiment, the surface is a net structure. Prior to packaging, the pet treat may undergo a variety of quality control measures to detect for metal and microbial activity in the finished product. For example, prior to packaging, the pet treats can be sent through a metal detection device. If the presence of metal is detected in the pet treats, the contaminated pet treat is removed from the packaging step.

In one embodiment, air in the bags is displaced (either drawn via a vacuum or pushed with an inert gas or gas blend) so as to reduce the level of oxygen in the bags. Then the bags are filled with the pet treats and the bags are purged in an atmosphere filled with nitrogen or an inert gas such as argon, or a combination of these gases. In another embodiment, the bags are filled with the portions of pet treats in a modified atmosphere containing nitrogen, inert gas (e.g., argon), carbon dioxide, or carbon monoxide, or any combination of two or more these gases. Any of these gasses can comprise about 0% to about 100% by weight of the gas composition. In one embodiment, the bags of pet treats comprise an atmosphere that includes nitrogen gas, carbon dioxide, and carbon monoxide. The purpose of the gas introduction is to reduce the amount of oxygen in the bag.

In general, typical meat or meat-based products include cooked meat with meat juice or fat may not be desirable by the pet owner or consumer. Alternatively, the pet treats described herein offer a more suitable handling. In one example embodiment, the resulting pet treat is made such that it does not leave sticky or oily residue on the fingers of the pet owner or consumer who handles the pet treat. To state another way, the pet treat leaves a minimum amount of residue on the fingers of the consumer. Moreover, the plurality of meat portions allows for a pet treat that has increased palatability and good ingredients.

For example, the addition of flour (e.g., wheat flour) can help soak up the fat content in the meat mixture, hence substantially reducing the potential of having a sticky residue when handling the pet treats. In addition, special blending techniques (e.g., vacuum blending as described in the above paragraphs) and other processes or techniques, maximize blending and reduce the occurrence of large chunks of meat in the meat mixture. The use of a dry oven with reduced humidity, as described in the above paragraphs, can produce pet treats with a substantially dry outer surface. This outer surface can form an outer dry surface to minimize the moisture from the one or more portions from bleeding out. Further, because the one or more portions are dried and the flavoring is found homogenously mixed the likelihood of transferring any dye or flavoring to a decorative surface is reduced because the dye or flavoring is less prone to contacting the decorative surface and is less prone to rub off if it does contact the decorative surface.

Figure 8:
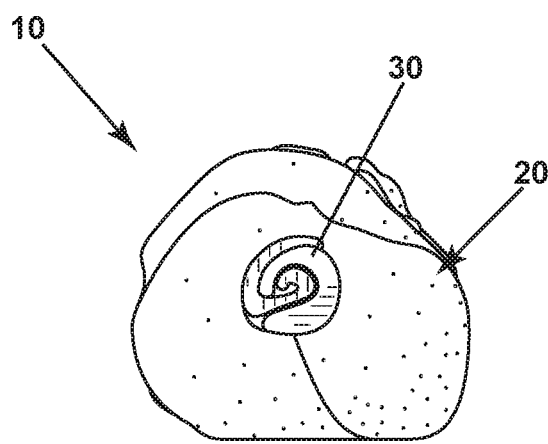
FIG. 8 is an end elevation view of a pet treat.
Figure 9:
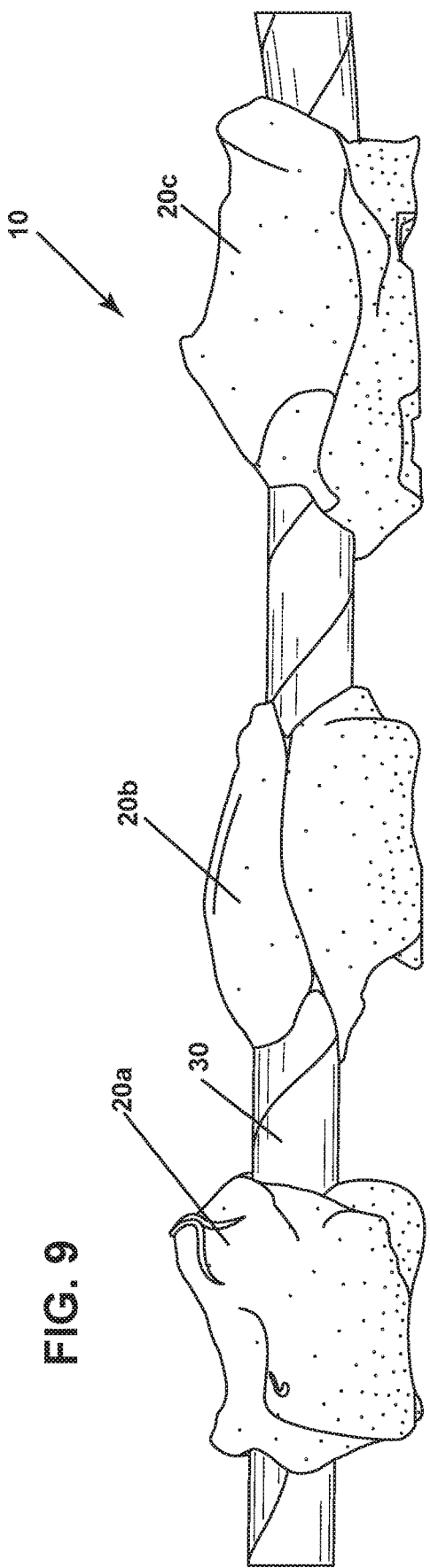
FIG. 9 is a side elevation view of a pet treat.

As shown in FIGS. 7-9, the final product is a pet treat 10 with one or more portions 20 positioned along a chew stick 30 with the appearance of a shish kabob. Referring to the ingredients and material described above, the pet treat 10 can comprise at least one rawhide section shaped to form a chew stick 30.

The one or more portions 20 are attached to the outside surface of the chew stick 30. If should be appreciated that the number of portions 20 placed along a chew stick will be related to consumer desire and commercial viability. However, the length of the chew stick, size of the one or more portions and proximity of the one or more portions to one another are all factors in determining the number of portions on the pet treat 10. As best shown in FIG. 9, each of the one or more portions are positioned in a manner that provide a space between the next adjacent portion where the outer surface of chew stick 30 is exposed. In some example embodiments, each of the one or more portions are positioned in a substantially equal distance from an adjacent portion. As described above, the one or more portions also comprise grooves on the outer surface.

Referring now to FIGS. 7 and 9 where pet treat is described showing three portions. As shown, each of the three portions 20a, 20b and 20c can be made from the same meat mixture formulation. Alternatively, pet treat can be made where at least two of the one or more portions on the pet treat 10 are from the same meat mixture formulation. In another alternative embodiment each of the one or more portions on the pet treat 10 are a different meat mixture formulation. In a related example embodiment the three portions are pork, beef and chicken or chicken, duck and liver. However, the specific meat mixture used for each portion can be selected from a group consisting of pork, beef, chicken, duck, goat, horse, buffalo, venison, elk, moose, liver, fish, veal, lamb, turkey, goose and combinations thereof.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments. Accordingly, all suitable modifications and equivalents should be considered as falling within the spirit and scope of the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A process for making a pet treat, the steps comprising:
   forming a meat mixture into portions, the meat mixture being subjected to a vacuum to form a homogeneous meat mixture;
   forming at least one sheet comprising rawhide into a chew stick having a stick-shaped appearance, wherein the stick shape appearance comprises a substantially uniform circumference along the length of the chew stick;
   positioning one or more of the portions on the external surface of the chew stick, wherein the one or more portions surround the circumference of a region of the chew stick, thereby forming a pet treat, wherein the one or more portions are positioned on the external surface of the chew stick;
   placing the pet treat on a surface, wherein the surface forms grooves on the outer surface of the one or more portions;
   drying the pet treat in an oven at about 40 degrees Celsius to about 60 degrees Celsius for at least 5 hours;
   baking the pet treat at a temperature of at least 80 degrees Celsius for at least 30 minutes; and
   packing a plurality of pet treats in a container.

2. The process of claim 1, wherein the pet treat comprises one or more coloring compounds selected from a group consisting of caramel coloring, malliouse, allura red AC, annatto, astaxanthin, betanin or beetroot red, blue 2, brilliant black BN, brilliant blue FCF, brown FK, canthaxanthin, carmine, carotene, Color Blue, curcumin, erythrosine, orange number 1, iron oxide, orange B, ponceau 6R, red 40, red 2G, saffron, sunset yellow FCF, tartrazine, titanium dioxide, turmeric, yellow 5, yellow 2, or any combination of two or more thereof.

3. The process of claim 1, further comprising forming two rawhide sheets and wherein each of two rawhide sheets are from a different animal source.

4. The process of claim 1, wherein the one or more portions comprises at least three portions and wherein each of the portions comprises a meat mixture comprising a meat base with one or more auxiliary ingredients and wherein each of the one or more portions on the pet treat are a different meat mixture formulation and wherein the pet treat comprises portions each having one of pork, beef and chicken or chicken, duck and liver.

5. The process of claim 1, wherein the meat mixture comprises mixing a meat base with one or more auxiliary ingredients and wherein the one or more auxiliary ingredients include a binding agent, a salt, a sugar, an acid, a mold inhibitor, a flavoring, an aroma compound, a coloring compound, or any combination of two or more thereof.

6. The process of claim 1, wherein the meat mixture comprises a meat selected from a group consisting of pork, beef, chicken, duck, goat, horse, buffalo, venison, elk, moose, liver, salmon, veal, lamb, turkey, goose and combinations thereof.

7. The process of claim 1, wherein the one or more portions comprise grooves on the outer surface of all of the one or more portions.

8. The process of claim 1, wherein the one or more portions comprises at least three portions and wherein each of the portions comprises a meat mixture comprising a meat base with one or more auxiliary ingredients and wherein each of the one or more portions on the pet treat are a different meat mixture formulation and wherein the pet treat comprises portions each having one of pork, beef and chicken or chicken, duck and liver.

9. The process of claim 1, wherein each of the one or more portions on the pet treat is made from the same meat mixture formulation.

10. The process of claim 1, wherein the pet treat comprise at least two portions and wherein the at least two portions on the pet treat are from the same meat mixture formulation.

* * * * *